(12) United States Patent
Jacob et al.

(10) Patent No.: US 11,814,181 B2
(45) Date of Patent: Nov. 14, 2023

(54) CONFORMAL THIN FILM HEATERS FOR ANGLE OF ATTACK SENSORS

(71) Applicant: ROSEMOUNT AEROSPACE INC., Burnsville, MN (US)

(72) Inventors: Robin Jacob, Bangalore (IN); John Sunil Palle, Bengaluru (IN); Guru Prasad Mahapatra, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 894 days.

(21) Appl. No.: 16/782,131

(22) Filed: Feb. 5, 2020

(65) Prior Publication Data

US 2021/0179278 A1    Jun. 17, 2021

(30) Foreign Application Priority Data

Dec. 11, 2019 (IN) .............................. 201911051312

(51) Int. Cl.
| | | |
|---|---|---|
| B64D 15/12 | (2006.01) | |
| G01P 13/02 | (2006.01) | |
| H05B 1/02 | (2006.01) | |
| H05B 3/34 | (2006.01) | |

(52) U.S. Cl.
CPC ............ B64D 15/12 (2013.01); G01P 13/025 (2013.01); H05B 1/0236 (2013.01); H05B 3/34 (2013.01)

(58) Field of Classification Search
CPC ....... B64D 15/12; B64D 43/02; G01P 13/025; H05B 1/0236; H05B 3/34; H05B 3/145; H05B 3/26; H05B 2203/02; H05B 2214/04
See application file for complete search history.

(56) References Cited

U.S. PATENT DOCUMENTS

| | | | | |
|---|---|---|---|---|
| 2,918,817 | A | * 12/1959 | Hughes, Jr. ............ | B64D 43/02 73/180 |
| 4,121,088 | A | * 10/1978 | Doremus ............... | B64D 15/16 219/505 |
| 6,076,963 | A | *  6/2000 | Menzies .............. | G01K 13/028 374/138 |
| 6,941,805 | B2 |  9/2005 | Seidel et al. | |
| 8,397,563 | B2 |  3/2013 | Pineau et al. | |
| 9,097,734 | B2 |  8/2015 | Seaton et al. | |
| 9,772,345 | B2 |  9/2017 | Golly et al. | |
| 10,179,654 | B2 |  1/2019 | Anderson et al. | |

(Continued)

FOREIGN PATENT DOCUMENTS

| | | | | |
|---|---|---|---|---|
| EP | 2950106 A1 | * 12/2015 | ............. | B64D 15/12 |
| EP | 2950106 A1 | 12/2015 | | |

(Continued)

OTHER PUBLICATIONS

EP Search Report; dated Apr. 23, 2021; Application No. 20213179.3; Filed Dec. 10, 2020; 8 pages.

(Continued)

*Primary Examiner* — Shawntina T Fuqua
(74) *Attorney, Agent, or Firm* — CANTOR COLBURN LLP

(57) ABSTRACT

Systems and devices for angle of attack sensors are provided. Aspects include a vane, a faceplate, an annular region in the faceplate, and a thin film heater assembly attached to a surface of the annual region.

12 Claims, 4 Drawing Sheets

(56) References Cited

U.S. PATENT DOCUMENTS

| | | | |
|---|---|---|---|
| 10,393,766 B2 | 8/2019 | Alcaya et al. | |
| 10,464,680 B2* | 11/2019 | Kinlen | H01B 1/122 |
| 2016/0221680 A1* | 8/2016 | Burton | H05B 3/34 |
| 2019/0104568 A1 | 4/2019 | Krueger | |
| 2019/0301949 A1 | 10/2019 | Gordon et al. | |
| 2019/0346479 A1* | 11/2019 | Reid | B64D 15/16 |
| 2020/0015323 A1* | 1/2020 | Chen | H05B 3/36 |

FOREIGN PATENT DOCUMENTS

| | | | | |
|---|---|---|---|---|
| EP | 3297395 A2 * | 3/2018 | | B32B 5/02 |
| EP | 3297395 A2 | 3/2018 | | |
| EP | 3321692 A1 * | 5/2018 | | G01D 11/00 |
| EP | 3321692 A1 | 5/2018 | | |
| EP | 3478025 A1 * | 5/2019 | | H05B 1/0236 |
| EP | 3478025 A1 | 5/2019 | | |
| EP | 3546907 A1 | 10/2019 | | |

OTHER PUBLICATIONS

European Office Action for EP Application No. 20213179.3 dated Oct. 10, 2022, pp. 1-6.
Minco "SmartHeat SLT Thin-Film Heaters", Product Brief, 2017, pp. 1-2.

* cited by examiner

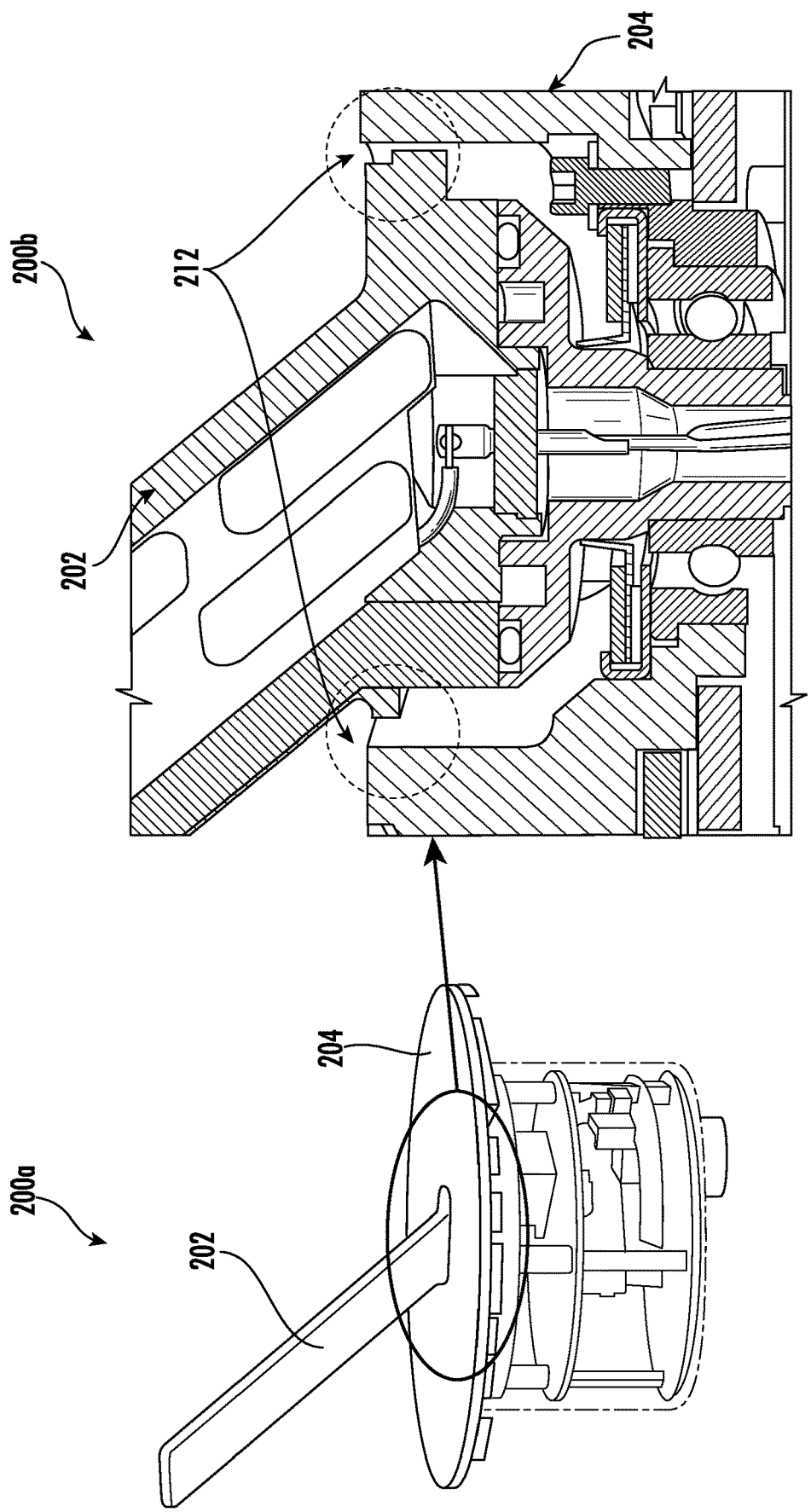

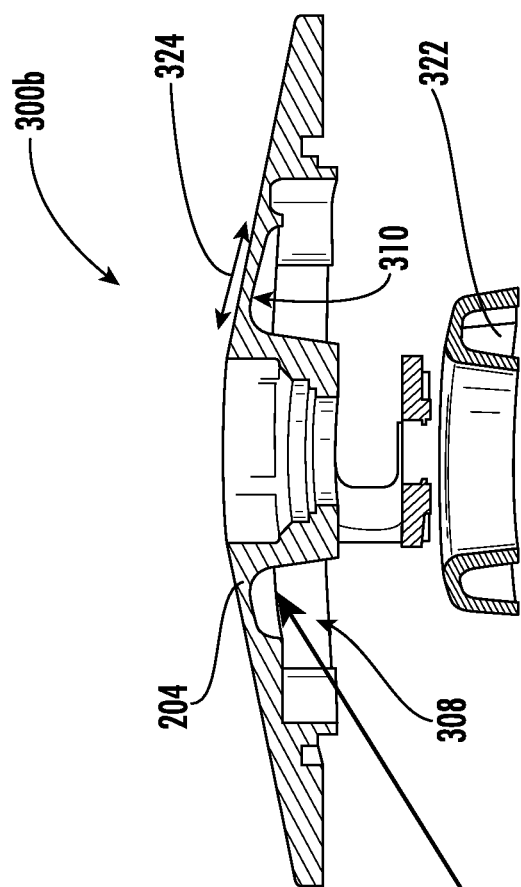
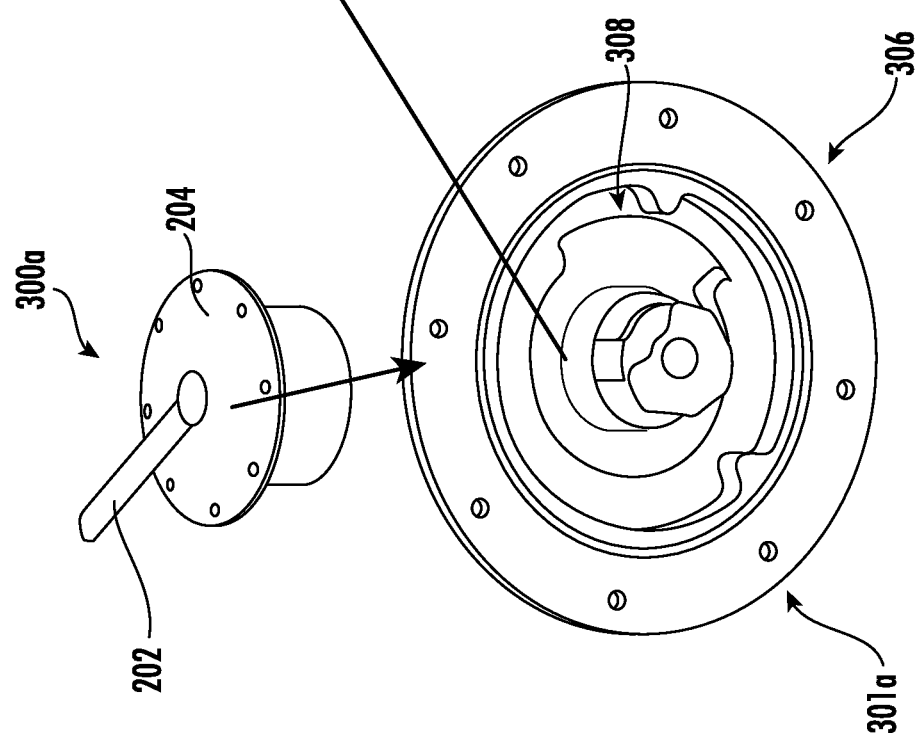

CONFORMAL THIN FILM HEATERS FOR ANGLE OF ATTACK SENSORS

CROSS-REFERENCE TO RELATED APPLICATIONS

This application claims the benefit of Indian Patent Application number 201911051312 filed Dec. 11, 2019, which is incorporated herein by reference in its entirety.

BACKGROUND

The present invention generally relates to angle of attack sensors, and more specifically, to conformal thin film heaters for angle of attack sensors.

For aircraft technology, angle of attack specifies the angle between the chord line of the wing of a fixed-wing aircraft and the vector representing the relative motion between the aircraft and the atmosphere. Since a wing can have twist, a chord line of the whole wing may not be definable, so an alternate reference line is simply defined. Often, the chord line of the root of the wing is chosen as the reference line. Another choice is to use a horizontal line on the fuselage as the reference line (and also as the longitudinal axis).

BRIEF DESCRIPTION

Embodiments of the present invention are directed to an angle of attack sensor. A non-limiting example of the sensor includes a vane, a faceplate, an annular region under the surface of the faceplate, and a thin film heater assembly attached to a top most surface of the annual region.

Embodiments of the present invention are directed to a system. A non-limiting example of the system includes an angle of attack sensor including a vane, a faceplate, an annular region under the surface of the faceplate, a thin film heater assembly attached to a top most surface of the annular region, a temperature feedback sensor, and a controller communicatively coupled to the thin film heater assembly, wherein the controller is configured to receive temperature data from the temperature feedback sensor, and operate the thin film heater assembly based at least in part on the temperature data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2a depicts a side view of an angle of attack sensor according to one or more embodiments;

FIG. 2b depicts a side view of an AoA sensor depicting the rotational mechanism for the AoA vane according to one or more embodiments;

FIG. 3a depicts a bottom view of an angle of attack sensor faceplate according to one or more embodiments;

FIG. 3b depicts a cutaway view of the angle of attack sensor faceplate according to one or more embodiments

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
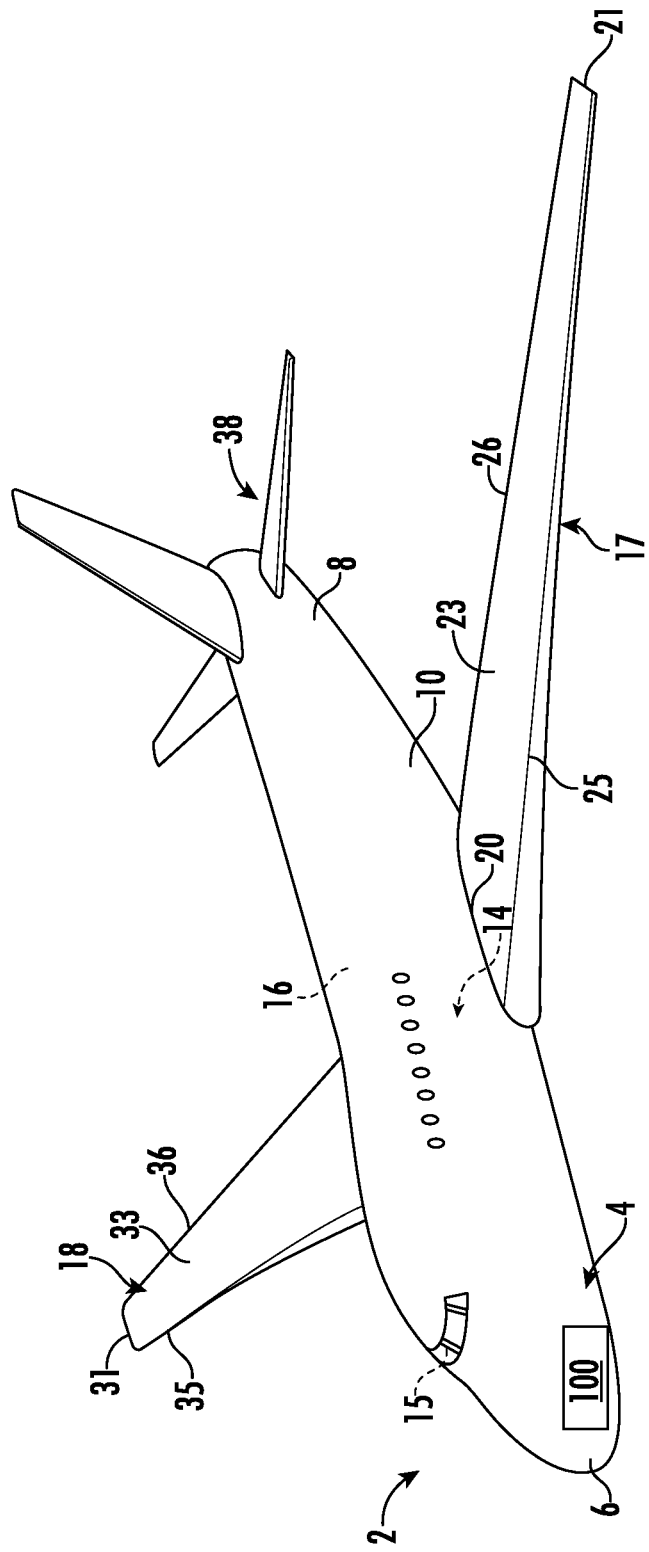
FIG. 1 is a perspective view of an aircraft that may incorporate embodiments of the present disclosure.

Referring now to the figures, FIG. 1 depicts a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger or cargo compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 54 configured to provide propulsion to the aircraft 2. The aircraft 2 also includes one or more angle of attack sensors 100.

Turning now to an overview of technologies that are more specifically relevant to aspects of the disclosure, angle of attack (AoA) sensors are utilized to indicate the angle between the chord line of an aircraft wing and a relative motion vector between the aircraft and the airflow. This measurement will provide the amount of lift generated by the aircraft wing. FIG. 2a depicts a side view of an angle of attack sensor according to one or more embodiments. The AoA sensor 200a includes a rotatable vane 202 and a stationary faceplate 204.

The rotation of the AoA vane 202 included in the sensor is required for the angle of attack measurement of the AoA sensor 200a. However, in icy conditions, the formation of ice in a cavity between the rotational surface 204 of the vane 202 and the stationary surface of a faceplate 204 can hinder the free rotation of the vane 202. AoA sensors are, typically, mounted external to an aircraft and are equipped with appropriate heating mechanisms for ice prevention under extreme icing conditions. FIG. 2b depicts a side view of an AoA sensor 200b depicting the rotational mechanism for the AoA vane 202 according to one or more embodiments. Critical areas include, but are not limited to, the stationary faceplate 204 exterior and the interior cavity regions 212 (shown as a dotted line) of the AoA sensor 200b. Typical heating elements include positive temperature coefficient (PTC) properties which self-regulates the heater power at higher temperatures and prevents overheating. AoA sensors require the cavities to be at a minimum of 15 degrees Celsius under dry air conditions. In the current configuration, it is a challenge to adhere to the 15 degree Celsius requirement at extremely low ambient temperatures (e.g., −44 degrees Celsius). This is due to the heater elements not being placed near the critical areas 212 to be heated (i.e., longer heat flow paths) and there is potential for heat loss paths.

Aspects of the present disclosure address the shortcomings described above by providing systems for heating portions of the angle of attack sensors and portions of an aircraft surface using thin film heaters. Thin film heaters can be effected for electro-thermal wing ice protection since they provide benefits of quick, uniform, and reliable heating. The thin film heaters are made up of nano-composites of carbon allotropes in a polymer/silicon matrix. A few examples of thin film heaters include positive temperature coefficient (PTC) heaters based on carbon black/polymer composite and carbon nanotube (CNT)/silicone nano composite (CNT heater). The thin film heaters generate surface heating when electrically energized depending on the electric resistivity-temperature characteristics of the thin film heater composite material. PTC heaters are self-regulating heaters in which the heater surfaces are heated to a pre-defined set temperature, beyond which the electric resistance drastically increases reducing the circuit current. CNT heaters are not self-regulating by default but could be made self-regulating by providing temperature feedback control.

In one or more embodiments, aspects of the present disclosure provide for use of thin film heaters that are placed conformally to the critical areas 212 in an angle of attack faceplate 204 for efficient heating. Current AoA faceplate design can be modified to enable creation of a thin film heater assembly (shown in FIG. 4) within an annular region or cavity (depicted in FIGS. 3a and 3b) below the surface of the AoA faceplate 204 thus providing the heater surfaces closer to the icing critical areas (212 from FIG. 2b). Also, the faceplate can be provided with enough material thickness to maintain the structural integrity of the faceplate to withstand external loads such as vibrational as well as hail strike impact loads.

FIG. 3a depicts a bottom view of an angle of attack sensor faceplate 301a according to one or more embodiments. The AoA sensor 300a includes a vane 302 and a face plate 304. The bottom view of the faceplate 304? depicts an annular region 308 beneath the surface of the faceplate 304. In one or more embodiments, a thin film heating assembly (shown in FIG. 4) can be conformally applied to the top surface 310 of this annular region 308. FIG. 3b depicts a cutaway view of the angle of attack sensor faceplate 300b According to one or more embodiments. The cutaway view highlights the areas 324 than can be heated when a thin film heating assembly (shown in FIG. 4) is conformally applied to the annular region 308 underneath the face plate 304. The heat transfer areas 324 inside the faceplate can be thermally insulated and protected from corrosive agents or sediments. An inner protective and thermally insulating cover 322 (protective cover) can be utilized and bonded to the thin film heater assembly (shown in FIG. 4). The protective cover 322 can be a thermal barrier coated metallic cover.

Figure 4:
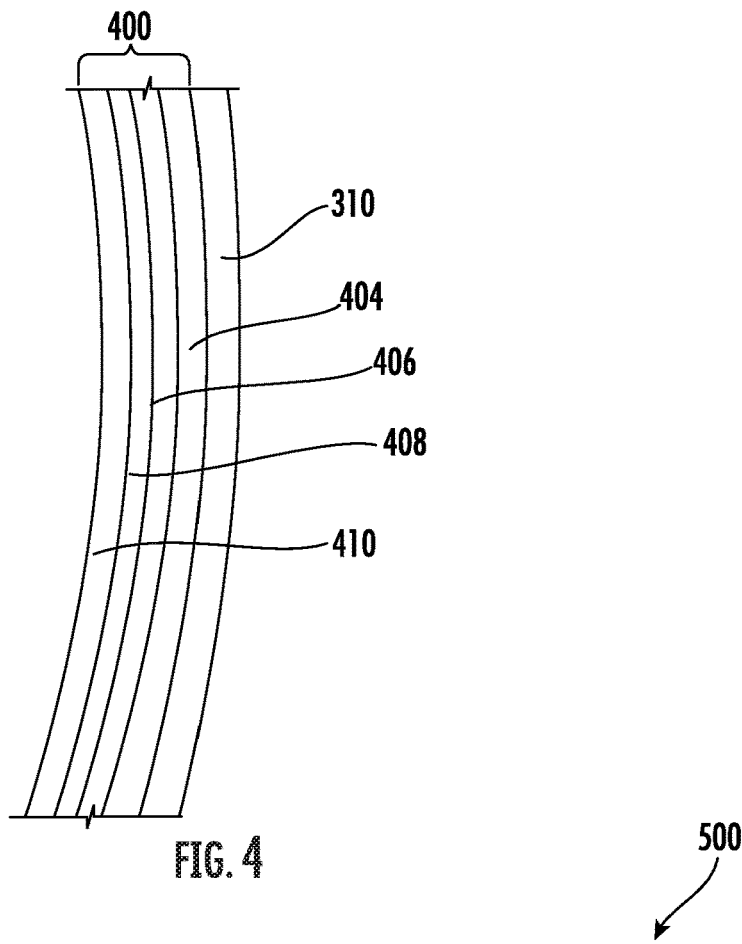
FIG. 4 depicts the layers of the thin film heater apparatus according to one or more embodiments.

FIG. 4 depicts the layers of the thin film heater apparatus according to one or more embodiments. The thin film heater assembly 400 includes a number of layers as shown in FIG. 4. The assembly 400 can be attached to the surface 310 in the annular region 308 of the faceplate 202 depicted in FIGS. 3a and 3b. The assembly 400 also includes an electric insulation and adhesive layer 404 that allows for insulation and adhesion of the subsequent layers to the surface 310 of the faceplate 202. The next layer is the thin film heater layer 406 which can include PTC heaters or CNT heaters. The next layer is a second electric insulation and adhesive layer 408. And the last layer is a protective cover and thermal insulation layer 410. The electric insulation and adhesive layers 404, 408 prevent current leakage to prevent short circuits. The adhesive ensures enhanced contact between the thin film heater layer 406 and the surface 310 of the faceplate 202 (from FIGS. 2, 3a, and 3b) and the protective cover layer 410. The combined thickness of the heater layer 406, insulation layers and adhesives 404, 408 are on the order of 0.03 inches. The radius of curvature can be as low as 0.02 inches.

In one or more embodiments, the thin film heater assembly 400 can be created by laying out the thin film heater layer 406 with the adhesives and electrical insulation 404, 408 on the face plate surface 402 (within the annular region under the face plate) with the adhesive bonding all the layers to each other and to the faceplate surface 402. The separate protective 410 cover can be fastened or bonded to the thin film heater assembly by curing. In one or more embodiments, the thin film heater assembly 400 can be bonded and cured to the protective cover 410 and then fastened to the face plate 402 for structural integrity and good contact with the surface of the face plate 402. In one or more embodiments, the thin film heater assembly 400 can be attached to the face plate surface 402 by a fastener.

The power densities required for an AoA heating application are of the order of 60-300 kW/m$^2$ for quicker heating. The thin film heaters are capable for customized rapid and uniform heating with the required power density (max. ~500 kW/m$^2$). Thin film heaters such as the CNT and PTC heaters are suited for quicker heating (e.g., in ground operations, reaching minimum 15 degrees Celsius in 3 minutes when heater is powered on). Both CNT and PTC heaters generate the required power density based on the electrical resistivity temperature characteristics.

In one or more embodiments, the AoA face plate critical surfaces are to be heated above freezing temperatures. Thin film heaters are made to heat surfaces to approximately 40 degrees Celsius which is more than sufficient to prevent/melt ice accumulation. The temperatures limit for the heater can be set at 40 degrees Celsius or below to meet the minimum temperature requirement by utilizing a standalone PTC heater or CNT heater with a temperature feedback sensor. During the ground operation, power consumption can be made minimal with thin film heaters operating above the minimum required temperature. In one or more embodiments, the PTC heaters are capable to provide variable heat densities to areas where more heating is required. For example, in an AoA under flight conditions, due to the increase airflow over the face plate surface in the upstream, there can be a higher heat transfer coefficients. That is to say, more power density has to be placed near the upstream region. In such cases, more localized power-density could be provided near the upstream and save power by reducing power density in other areas. Power densities depend on the concentration of carbon in the matrix.

Figure 5:
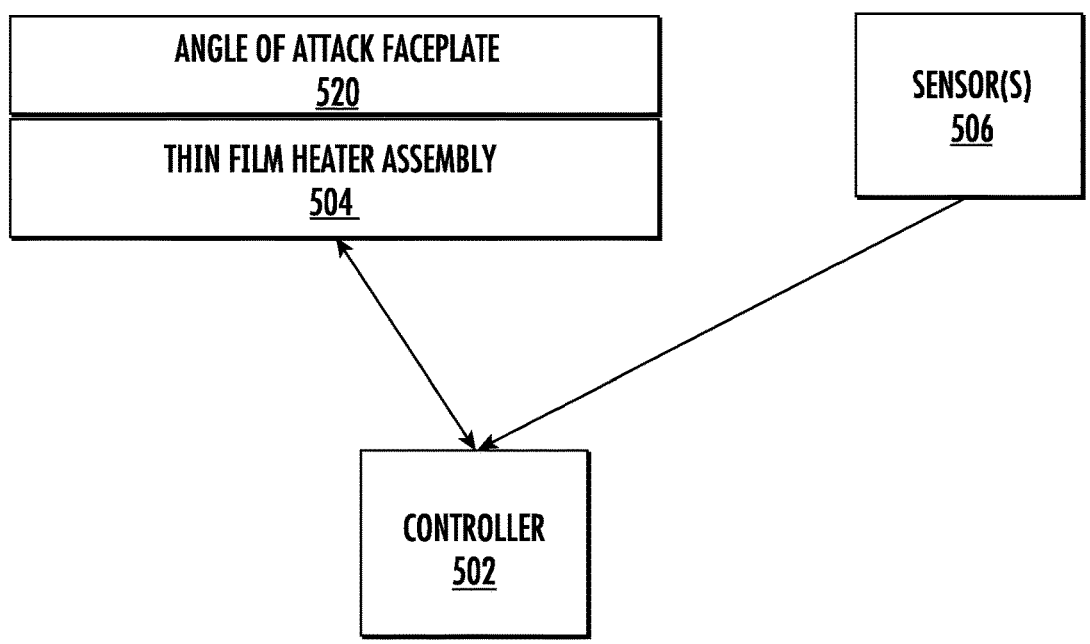
FIG. 5 depicts a system for preventing ice accumulation in an angle of attack sensor according to one or more embodiments.

FIG. 5 depicts a system for preventing ice accumulation in an angle of attack sensor according to one or more embodiments. The system 500 includes a controller 502 that is electrically and communicatively coupled to a thin film heater assembly 504. The thin film heaters assembly 504 can be any type of configuration including the configuration described in FIG. 4 or a CNT and PTC heater in other configurations. The thin film heater assembly 504 can be conformally applied to the bottom surface of an angle of attack faceplate 520 to provide heat to critical areas under the face plate 520. The controller 502 is configured to provide power to operate the thin film heater assembly 504. In addition, the controller 502 can be communicatively coupled to one or more external sensors 506 and/or the controller 502 can be communicatively coupled to one or more internal sensors within the thin film heater assembly 504. As mentioned above, the internal sensors or external sensors 506 can collect temperature data associated with the AoA sensor environment to allow the controller 502 to determine that a minimum temperature is maintained in the AoA sensor. In addition, the internal sensors or external sensors 506 can be temperature feedback sensors to determine the temperature of the thin film heater assembly 504. The feedback sensors can provide temperature data for the controller 502 to utilize to operate the thin film heater assembly 504. For example, a maximum temperature can be determined to allow for sufficient heat to curb ice accumulation and also to allow for normal operation of the AoA sensor. The controller 502 can utilize the feedback data to control the heater assembly 504 to not go above the determined maximum temperature by either reducing the power supplied to the assembly 504 or turning the assembly off for a period of time. The feedback controller 502 is utilized for CNT heater assemblies.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An angle of attack sensor for an aircraft, comprising:
    a rotary vane;
    a stationary faceplate; having: an exterior; and an interior annular cavity with a top surface that is adjacent to the exterior and defines a heat transfer area; and
    a thin film heater assembly attached to the top surface of the annual cavity and comprises a thin film heater layer that is a positive temperature coefficient (PTC) heater or a carbon nanotube (CNT) heater, and
    wherein the heat transfer area is thermally insulated by a protective cover bonded to the thin film heater assembly.

2. The angle of attack sensor of claim 1, wherein the thin film heater assembly is attached to the surface of the annual region by an adhesive.

3. The angle of attack sensor of claim 1, wherein the thin film heater assembly is attached to the surface of the annual region by a curing process.

4. The angle of attack sensor of claim 1, wherein the thin film heater assembly comprises: a first film adhesive layer; a first electrical insulator layer; the thin film heater layer; a second film adhesive layer; and a second electrical insulator layer.

5. The angle of attack sensor of claim 1, wherein the thin film heater assembly is attached to the surface of the annual region by a fastener.

6. The angle of attack sensor of claim 1, wherein the thin film heater assembly is attached conformally to the surface of the annular region.

7. A system comprising:
the angle of attack sensor of claim 1;
a temperature feedback sensor; and
a controller communicatively coupled to the thin film heater assembly, wherein the controller is configured to:
receive temperature data from the temperature feedback sensor; and
operate the thin film heater assembly based at least in part on the temperature data.

8. The system of claim 7, wherein the thin film heater assembly is attached to the surface of the annual region by an adhesive.

9. The system of claim 7, wherein the thin film heater assembly is attached to the surface of the annual region by a curing process.

10. The system of claim 7, wherein the thin film heater assembly comprises: a first film adhesive layer; a first electrical insulator layer; the thin film heater layer; a second film adhesive layer; and a second electrical insulator layer.

11. The system of claim 1, wherein the thin film heater assembly is attached to the surface of the annual region by a fastener.

12. The system of claim 7, wherein the thin film heater assembly is attached conformally to the surface of the annular region.

* * * * *